US012792119B2

(12) United States Patent
Demarie et al.

(10) Patent No.: US 12,792,119 B2

(45) Date of Patent: Nov. 10, 2026

(54) SYNCHRONIZING AUTOMATIC TURN ON OF POWER SUPPLY UNITS

(71) Applicant: International Business Machines Corporation, Armonk, NY (US)

(72) Inventors: Mark L. Demarie, Poughkeepsie, NY (US); Frederic George Freck, Lagrangeville, NY (US); Justin Henspeter, Kasson, MN (US); Eric B. Swenson, Pine Island, MN (US)

(73) Assignee: International Business Machines Corporation, Armonk, NY (US)

(*) Notice: Subject to any disclaimer, the term of this patent is extended or adjusted under 35 U.S.C. 154(b) by 13 days.

(21) Appl. No.: 18/185,480

(22) Filed: Mar. 17, 2023

(65) Prior Publication Data

US 2024/0310890 A1 Sep. 19, 2024

(51) Int. Cl.

*G06F 1/28* (2006.01)
*G06F 1/26* (2006.01)

(52) U.S. Cl.

CPC ................ *G06F 1/28* (2013.01); *G06F 1/263* (2013.01)

(58) Field of Classification Search

None
See application file for complete search history.

(56) References Cited

U.S. PATENT DOCUMENTS 8,196,831 B2 6/2012 Carrick et al.
9,843,330 B1 * 12/2017 Attah .................... H02M 3/157
10,116,231 B2 10/2018 Huang et al.
10,355,520 B2 7/2019 Wang et al.
10,788,850 B2 9/2020 Chen et al.
11,211,867 B2 * 12/2021 Xu ...................... H02M 3/1584
11,237,611 B2 2/2022 Messick et al.
2006/0074450 A1 * 4/2006 Boveja ............... A61N 1/36114 607/2
2012/0191988 A1 * 7/2012 Li ......................... G06F 1/3206 713/300
2012/0230069 A1 9/2012 Tzeng et al.
(Continued)

FOREIGN PATENT DOCUMENTS

CN 103427600 A 12/2013
CN 109639146 A 4/2019
(Continued)

OTHER PUBLICATIONS

Frivaldsky et al., "Control Strategy Proposal for Modular Architecture of Power Supply Utilizing LCCT Converter," Energies 2018, vol. 11, Issue 12, Published Nov. 28, 2018, 19 pages.

*Primary Examiner* — Paul Yen
(74) *Attorney, Agent, or Firm* — Yee & Associates, P.C.

(57) ABSTRACT

Described are techniques for turning on a power supply unit. The techniques include a processor unit in the power supply unit to monitor an output voltage bus, wherein the power supply unit is connected to the output voltage bus. The processor unit in the power supply unit switches on the power from the power supply unit to the output voltage bus in response to a bus voltage on the output voltage bus not being greater than a voltage threshold for a safe time period. The processor unit switches on the power from the power supply unit to the output voltage bus in response to the bus voltage being greater than voltage threshold for a time stable period.

17 Claims, 9 Drawing Sheets

(56) References Cited

U.S. PATENT DOCUMENTS

| | | | | |
|---|---|---|---|---|
| 2012/0327688 | A1* | 12/2012 | Guthrie ................. | H02M 3/285 363/15 |
| 2016/0006343 | A1 | 1/2016 | Terada et al. | |
| 2018/0292875 | A1* | 10/2018 | Banerjee ................. | G06F 1/266 |
| 2019/0317580 | A1 | 10/2019 | Yang | |

FOREIGN PATENT DOCUMENTS

| | | | |
|---|---|---|---|
| EP | 2985849 | A1 | 2/2016 |
| JP | 7018736 | B2 | 2/2022 |
| WO | 2014204441 | A1 | 12/2014 |

* cited by examiner

SYNCHRONIZING AUTOMATIC TURN ON OF POWER SUPPLY UNITS

BACKGROUND

The disclosure relates generally to power supply systems and more specifically to synchronizing automatic turn on of multiple power supply systems, Power supply units operate to convert an alternating current into regulated direct current for a computer. This direct current is used to operate components such as a motherboard, a processor, and peripheral devices. With increasing power needs, multiple power supply units can be used when a single power supply unit cannot support the load needed. In some cases, multiple power supplies can be present for a computer with these power supply units (PSU) being connected in parallel to provide power to the computer.

When multiple power supply units turn on into heavy loads, protection mechanisms, such as overcurrent protection (OCP), can be triggered. This type of situation can result in undesired behavior that can cause downstream issues to components receiving power from the power supply units. This situation may also result in a complete failure to power on.

SUMMARY

According to one illustrative embodiment, a method for turning on a power supply unit. A processor unit in the power supply unit monitors an output voltage bus, wherein the power supply unit is connected to the output voltage bus. The processor unit in the power supply unit switches on the power from the power supply unit to the output voltage bus in response to a bus voltage on the output voltage bus not being greater than a voltage threshold for a safe time period. The processor unit switches on the power from the power supply unit to the output voltage bus in response to the bus voltage being greater than voltage threshold for a stable time period.

According to other illustrative embodiments, a computer system and a computer program product for turning on a power supply are provided. As a result, the illustrative embodiments can provide a technical effect of reducing initiation of protection mechanisms.

The illustrative embodiments can permissively switch on the power from the power supply unit to the output voltage bus in response to the bus voltage on the output voltage bus being greater than the voltage threshold and the counter not being zero. As a result, the illustrative embodiments can provide a technical effect of synchronizing the start of the power supply unit with another power supply unit that has begun supplying power to the output voltage bus.

The illustrative embodiments can permissively set a counter to a safe time in response to the bus voltage not being greater than the voltage threshold; determine whether the bus voltage is greater than the voltage threshold; decrement the counter in response to the bus voltage not being greater than the voltage threshold and the counter being set; determining, by the processor unit in the power supply unit, whether the counter is zero in response to decrementing the counter; waiting for a delay period in response to the counter not being zero; repeating, determining whether the bus voltage is greater than the voltage threshold; decrementing the counter in response to the bus voltage not being greater than the voltage threshold and the counter being set; determining whether the counter is zero in response to decrementing the counter; and waiting for the delay period in response to the counter not being zero, wherein the safe time period ends when the counter is zero. As a result, the illustrative examples can provide a technical effect of starting to supply power to a power voltage bus after a safe period of time to allow for circuits that may have previously received power to discharge.

The illustrative embodiments can permissively set a counter to a stable time in response to the bus voltage being greater than the voltage threshold; determine whether the bus voltage is greater than the voltage threshold in response to the counter being set; decrement the counter in response to the bus voltage being greater than the voltage threshold; determine whether the counter is zero in response to decrementing the counter; wait for a delay period in response to decrementing the counter and the counter not being zero; and repeat determining whether the bus voltage is greater than the voltage threshold in response to the counter being set; decrementing the counter in response to the bus voltage being greater than the voltage threshold; determining whether the counter is zero in response to decrementing the counter; and waiting for the delay period in response to decrementing the counter and the counter not being zero, wherein the stable time period ends when the counter is zero. As a result, the illustrative examples can provide a technical effect the power supply supplying power to the output voltage bus after determining that a prior power supply unit already supplying power to the output voltage bus is stable.

As a result, the illustrative embodiments can provide a technical effect of determining when a discharge period has passed for circuits connected to the power supply bus for reducing the occurrence of circuit faults.

DETAILED DESCRIPTION

Figure 1:
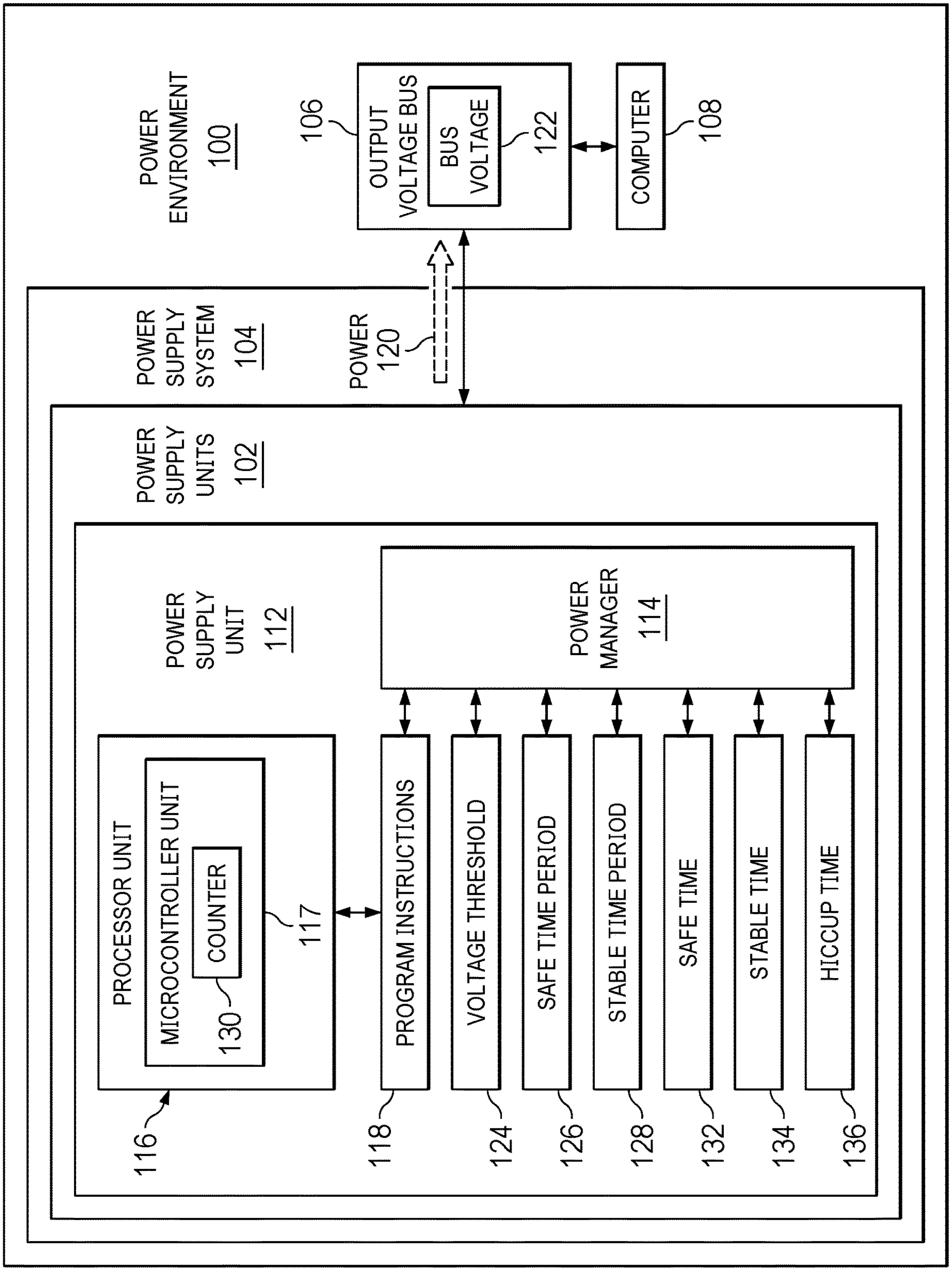
FIG. 1 is a block diagram of a power supply environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The illustrative examples recognize and take into account a number of different considerations as described herein. For example, multiple power supply units can be used in parallel to supply power to computers. Power supply units can provide two types of output voltages for two types of power, bulk and auxiliary. A bulk voltage typically provides most of the power to a computer. For example, the bulk voltage may provide several kilowatts of power. With this example, the auxiliary voltage can provide power at a level of about 50 Watts or less. The auxiliary voltage provides power to start up the computer system or other circuits.

Typically, a single power supply unit is sufficient to supply the auxiliary power needed by a computer or other system. However, as newer computers use more power, power supply units can be connected in parallel to provide greater capacity in supplying auxiliary power. With a power supply unit, auxiliary power needs to be turned on automatically. This typically occurs when the power supply unit is plugged in or connected to an input.

Currently, synchronization between power supply units does not occur. Without a means to synchronize the automatic start of the power supply units, the loads can cause individual power supply units to fault or fail as they attempt to turn on to supply power. This situation can result in undesired and unknown behaviors. For example, continuous cycling on and off of one or more of the power supply units can occur. This type of cycling is also referred to as a hiccup. Further, these undesired behaviors can cause downstream issues in the computer connected to the power supply units. Designing a higher capacity auxiliary power in the same form factors is not always an option.

Thus, the illustrative examples provide a method, apparatus, system, and computer program for automatically starting power supply units connected in parallel. In the illustrative example, the automatic turn on of the power supply units can be synchronized in a manner that does not require a dedicated wire or link between the power supply units. In other words, changes to the power supply units to include communications links are unnecessary. The illustrative examples can be implemented in currently available power supply units with the addition of program code for the processors in the power supply units.

With reference now to the figures in particular with reference to FIG. 1, a block diagram of a power supply environment is depicted in accordance with an illustrative embodiment. Power environment 100 contains an example of an environment for the execution of at least some of the computer code involved in turning on power supply units 102 in power supply system 104. In this example, power supply system 104 comprises power supply units 102 connected in parallel to output voltage bus 106 to supply power to computer 108. In this example, computer 108 can take the form of a desktop computer, laptop computer, tablet computer, mainframe computer, quantum computer or any other form of computer or mobile device now known or to be developed in the future that is capable of running a program, accessing a network or querying a database.

In this illustrative example, power supply unit 112 in power supply units 102 control the supply of power 120 to output voltage bus 106 by power supply unit 112 using power manager 114. In this example, power 120 is supplied to computer 108 through output voltage bus 106.

Power manager 114 can be implemented in software, hardware, firmware or a combination thereof in power supply unit 112. When software is used, the operations performed by power manager 114 can be implemented in program instructions configured to run on hardware, such as a processor unit. When firmware is used, the operations performed by power manager 114 can be implemented in program instructions and data and stored in persistent memory to run on a processor unit. When hardware is employed, the hardware can include circuits that operate to perform the operations in power manager 114.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

In this illustrative example, power supply unit 112 includes processor unit 116 that is capable of executing program instructions 118 implementing processes for power manager 114. In other words, program instructions 118 are computer readable program instructions.

As used herein, processor unit 116 is a hardware device and is comprised of hardware circuits such as those on an integrated circuit that respond to and process instructions and program instructions that operate a computer. Processor unit 116 can be selected from one of a single core processor, a dual-core processor, a multi-processor core, a general-purpose central processing unit (CPU), a graphics processing unit (GPU), a digital signal processor (DSP), or some other type of processor unit. In this illustrative example, processor unit 116 is microcontroller unit (MCU) 117.

The illustrative example, power manager 114 monitors output voltage bus 106. As depicted, power supply unit 112 is connected to output voltage bus 106. For example, power manager 114 monitors bus voltage 122 on output voltage bus 106.

Power manager 114 switches on power 120 from power supply unit 112 to output voltage bus 106 in response to bus voltage 122 on output voltage bus 106 not being greater than voltage threshold 124 for safe time period 126.

In this illustrative example, voltage threshold 124 is a value used to indicate when power is being supplied to output voltage bus 106. Safe time period 126 is selected as a period of time needed for circuits that may have been powered to discharge. The circuits can be circuits in computer 108 that receive power from a power supply unit that turned on, faulted, and turned off. In this example, bus voltage 122 rises and becomes greater than voltage threshold 124 in response to power 120 being applied to bus voltage 122.

Additionally, power manager 114 switches on power 120 from power supply unit 112 to output voltage bus 106 in response to bus voltage 122 being greater than voltage threshold 124 for stable time period 128. In this case, power has already been supplied to output voltage bus 106 from another power supply unit in power supply units 102 because bus voltage 122 is greater than voltage threshold 124. Power manager 114 waits for stable time period 128 before switching on power 120 from power supply unit 112 to output voltage bus 106 to determine whether the power being supplied to output voltage bus 106 is stable.

In other words, stable time period 128 can be selected as a time period that passes such that another power supply unit in power supply unit 102 supplying power to bus voltage 122 does not fault and turn off. In this illustrative example, these time periods can be measured using counter 130. Counter 130 can be set to a time value that decrements to zero after the desired time period.

In determining whether bus voltage 122 is not being greater than voltage threshold 124 for safe time period 126, power manager 114 can set counter 130 to safe time 132 in response to bus voltage 122 not being greater than voltage threshold 124. As depicted, safe time 132 can be a number of seconds, milliseconds or some other time that represents safe time period 126.

In this example, power manager 114 can determine whether bus voltage 122 is greater than voltage threshold 124. Power manager 114 can decrement counter 130 in response to bus voltage 122 not being greater than voltage threshold 124 with counter 130 being set. In this example, the counter can be decremented after a delay period. For example, if the delay period is one millisecond, safe time 132 can be decremented by one millisecond.

Power manager 114 determines whether counter 130 is zero in response to decrementing counter 130. In response to counter 130 not being zero, power manager 114 waits for a delay period. Power manager 114 then repeats determining whether bus voltage 122 is greater than voltage threshold 124; decrementing counter 130 in response to bus voltage 122 not being greater than voltage threshold 124 and counter 130 being set; determining whether counter 130 is zero in response to decrementing counter 130; and waiting for the delay period in response to counter 130 not being zero. With this loop of steps, safe time period 126 ends when counter 130 is zero.

In this example, power manager 114 can switch on power 120 from power supply unit 112 to output voltage bus 106 in response to bus voltage 122 on output voltage bus 106 being greater than voltage threshold 124 and counter 130 not being zero. In this case, another power supply unit has waited for the safe time period and is suppling power to output voltage bus 106.

In determining whether bus voltage 122 has been greater than voltage threshold 124 for stable time period 128, power manager 114 can set counter 130 to stable time 134 in response to bus voltage 122 being greater than voltage threshold 124. After setting counter 130, power manager 114 determines whether bus voltage 122 is greater than voltage threshold 124 in response to counter 130 being set. Power manager 114 decrements counter 130 in response to bus voltage 122 not being greater than voltage threshold 124. Power manager 114 determines counter 130 is zero in response to decrementing counter 130. In response to decrementing counter 130 and counter 130 not being zero, power manager 114 waits for a delay period.

Power manager 114 repeats determining whether bus voltage 122 is greater than voltage threshold 124 in response to counter 130 being set; decrementing counter 130 in response to bus voltage 122 not being greater than voltage threshold 124; determining whether counter 130 is zero in response to decrementing counter 130; and waiting for the delay period in response to decrementing counter 130 and counter 130 not being zero. With this loop of steps, stable time period 128 ends when counter 130 reaches zero.

Further when counter 130 has been set with stable time 134, power manager 114 sets counter 130 to hiccup time 136 in response to bus voltage 122 not being greater than voltage threshold 124. In this example, hiccup time 136 is used in place of the current value of counter 130 because the current value originally set using stable time 134 is no longer needed because the voltage has dropped below the threshold for indicating power is present on output voltage bus 106. In other words, stable time 134 for set to determine the stability of power on output voltage bus 106 is no longer needed because the power has become unstable with bus voltage 122 not being greater than voltage threshold 124.

In this case, current value in counter 130 is overwritten with hiccup time 136. In this case, another power supply unit in power supply units 102 was supplying power to output voltage bus 106 and the power supply unit shut off resulting in bus voltage 122 no longer being greater than voltage threshold 124.

Power manager 114 determines bus voltage 122 is greater than voltage threshold 124. Power manager 114 switches on power 120 from power supply unit 112 to output voltage bus 106 in response to bus voltage 122 being greater than voltage threshold 124. Power manager 114 decrements counter 130 in response to bus voltage 122 not being greater than voltage threshold 124 and counter 130 being set. Additionally, power manager 114 determines whether counter 130 is zero in response to decrementing counter 130. Power manager 114 switches on power 120 from power supply unit 112 to output voltage bus 106 in response to counter 130 being zero. In this case, counter 130 has been set to hiccup time 136. On the other hand, power manager 114 waits for a delay period in response to counter 130 not being zero.

Power manager 114 can repeat determining whether bus voltage 122 is greater than voltage threshold 124; switching on power 120 by power supply unit 112 to output voltage bus 106 in response to bus voltage 122 being greater than voltage threshold 124; decrementing counter 130 in response to bus voltage 122 not being greater than voltage threshold 124 and counter 130 being set; determining whether counter 130 is zero in response to decrementing counter 130; switching on power 120 by power supply unit 112 to output voltage bus 106 in response to counter 130 being zero; and waiting for the delay period in response to counter 130 not being zero.

In one illustrative example, one or more technical solutions are present that overcome a technical problem with turning on multiple power supply units connected in parallel that supply power to an output voltage bus connected to a computer or in a computer. As a result, one or more technical solutions may provide a technical effect synchronizing the automatic turning on of power supply units to supply power. The illustrative examples can provide a technical solution to heavy loading situations that cause one of the power supply units to fault and turn off.

The illustration of our environment in FIG. 1 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the different features described have been described for power supply unit 112 in power supply units 102, other power supply units in power supply units 102 also include the same features. As a result, when power manager 114 for power supply unit 112 sees instability in the power being supplied to output voltage bus 106 after seeing power being supplied on output voltage bus 106, power manager 114 sets counter 130 to hiccup time 136 in response to bus voltage 122 not being greater than voltage threshold 124. In this case, another power supply unit in power supply units 102 was supplying power to output voltage bus 106 and shut off resulting in bus voltage 122 no longer being greater than voltage threshold 124.

Further, other power supply units in power supply units 102 monitoring output voltage bus 106 also see the same instability and also set counters for a hiccup time. As a result, power supply units 102 can be synchronized to automatically turn on at the same time. This synchronized timing can occur after hiccup time 136 has passed or if another power supply unit in power supply units 102 turns on after a safe time period has passed for the power supply unit.

Figure 2:
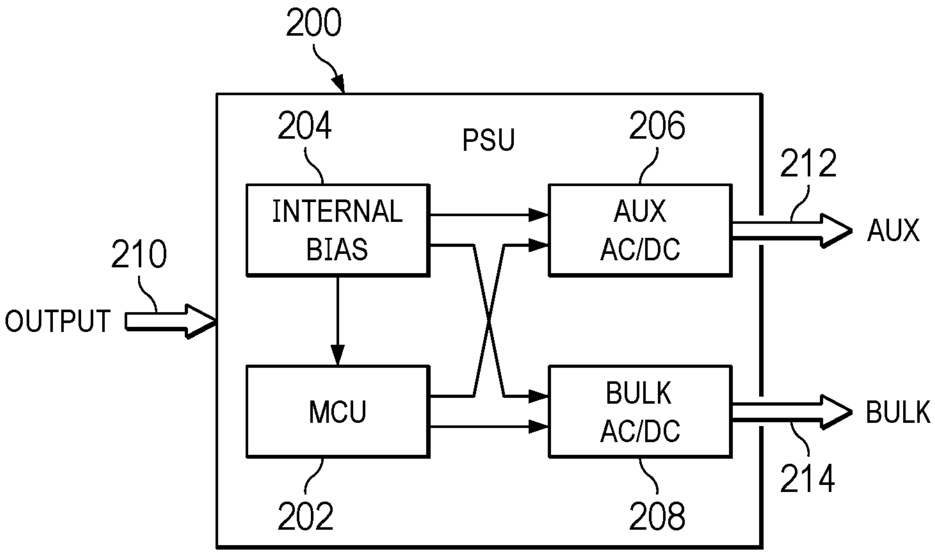
FIG. 2 is an illustration of a power supply unit in accordance with an illustrative embodiment.

With reference next to FIG. 2, an illustration of a power supply unit is depicted in accordance with an illustrative embodiment. As depicted, power supply unit (PSU) 200 is an example of one implementation for power supply unit 112 in FIG. 2. As depicted, power supply unit 200 comprises microcontroller unit (MCU) 202, internal bias 204, AUX AC/DC 206, and bulk AC/DC 208.

In this illustrative example, power supply unit 200 can receive outlet power 210 when power supply unit 200 is plugged into an outlet. In this example, internal bias 204 receives outlet power 210 and controls the flow of power to microcontroller unit 202, AUX AC/DC 206, and bulk AC/DC 208. Internal bias 204 provides initial power to components within power supply unit 200. In other words, internal bias 204 provides power to run the components as part of generating auxiliary (AUX) power 212 and bulk power 214.

As depicted, AUX AC/DC 206, and bulk AC/DC 208 both convert an alternating current into direct current for the power output by these components. In this example, auxiliary power 212 is an example of power 120 in FIG. 1.

As depicted, microcontroller unit 202 is an example of microcontroller unit 117 in FIG. 1 and operates to control the operation of AUX AC/DC 206 and bulk AC/DC 208. In this example, microcontroller unit 202 can run code for power manager 114 in FIG. 1.

In this illustrative example, microcontroller unit 202 can control turning on auxiliary power 212 in a manner that synchronizes the turning on of power from other power supply units that are connected in parallel with power supply unit 200. Further, in this example, power supply unit 200 can control when to supply power, monitor the output of power, monitor an output voltage bus, and include timers for timing loops in processes in power manager 114 to enable synchronizing its operation with others power supply units connected in parallel to supply power to the computer or other computing device.

Figure 3:
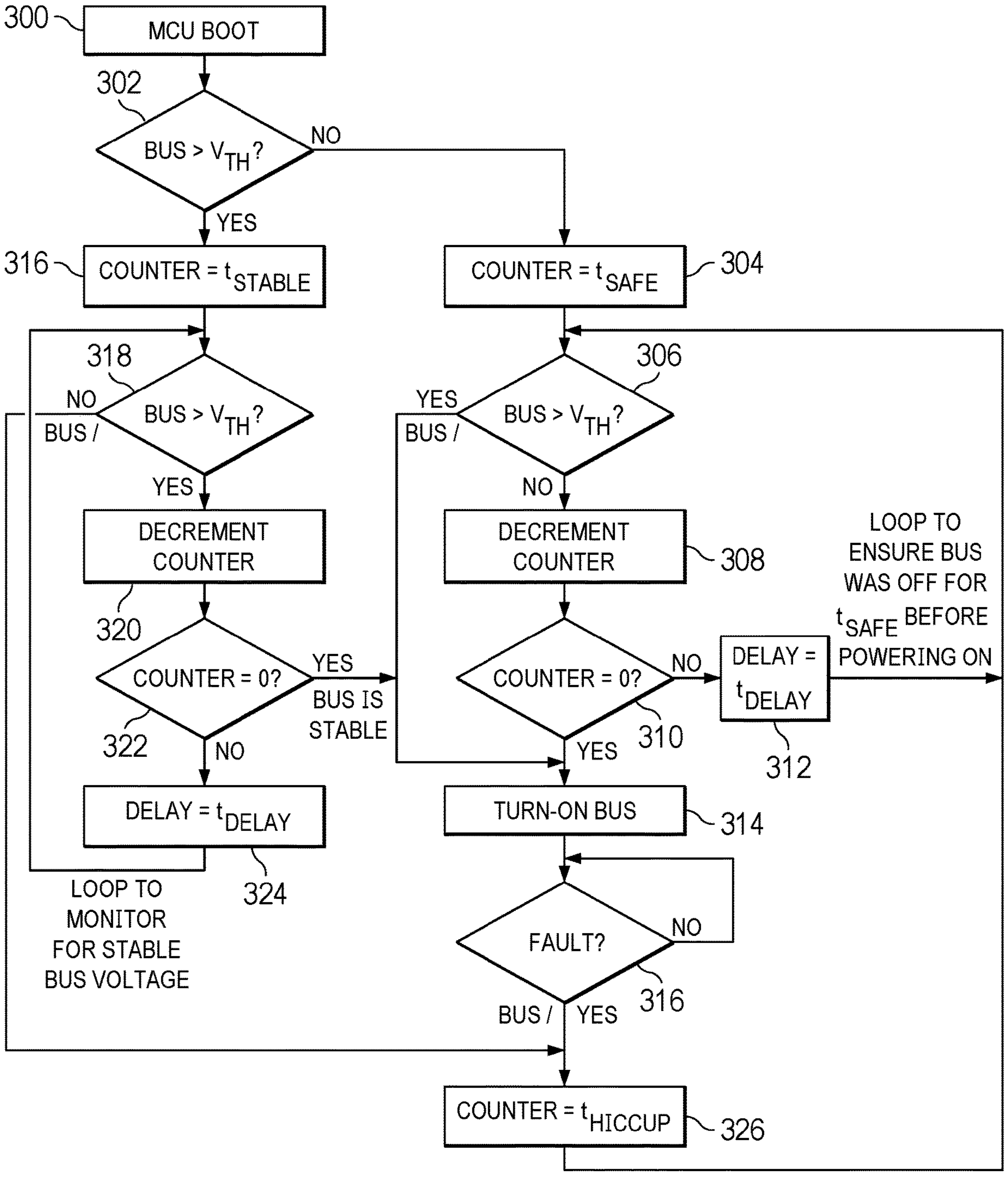
FIG. 3 is a flowchart of a process for on power from power supply unit to an output voltage bus in accordance with an illustrative embodiment.

Reference next to FIG. 3, a flowchart of a process for on power from power supply unit to an output voltage bus is depicted in accordance with an illustrative embodiment. FIG. 3 can be implemented in hardware, software, or both. When implemented in software, the process can take the form of program instructions that are run by one of more processor units located in one or more hardware devices in one or more computer systems. For example, the process can be implemented in power manager 114 in power supply unit 112 in FIG. 1. In this example, the process for power manager 114 can run in microcontroller unit 117.

The process begins with the microcontroller booting (step 300). The process determines whether the bus voltage (BUS) is greater than the voltage threshold ($V_{TH}$) (step 302). In step 300, the voltage threshold is set at a level to indicate when power is considered to be present on the output voltage bus. In this example, if power is present when the bus voltage is 12 V, the voltage threshold can be set at 10 V.

If the bus voltage is not greater than the voltage threshold, the process sets the counter equal to a safe time ($t_{SAFE}$) (step 304). This safe time is used to ensure that the output bus does not have power for a safe time period to enable any circuits to discharge. This time period can be safe time period 126 in FIG. 1. In one illustrative example, the safe time ($t_{SAFE}$) is an example of safe time 132 in FIG. 1 and can be set to about 100 ms. The amount of time can change depending on the particular implementation and power supply units used.

A determination is made as to whether the bus voltage (BUS) is greater than the voltage threshold ($V_{TH}$) (step 306). If the bus voltage is not greater than the voltage threshold ($V_{TH}$), the process decrements the counter (step 308). A determination is made as to whether the counter is equal to zero (step 310). If the counter is not equal to zero, the process waits for a delay period ($t_{DELAY}$) (step 312) and then returns to step 306 after the delay period ($t_{DELAY}$).

The process loops through steps 306, 308, 310, and 312 until the counter is equal to zero. With reference again step 310, if the counter is zero, the process turns on power to the output voltage bus (step 314). A determination is then made as to whether a fault occurs (step 316). If a fault does not occur, the process continues to loop back to step 316. Further, in this loop if the bus voltage is greater than the voltage threshold in step 306 after the counter has been set to the safe time ($t_{SAFE}$), the process also proceeds to step 314 to turn on power to the output voltage bus.

Additionally, the loops through steps 306, 308, 310, and 312 can stop in response to a determination that the bus voltage (BUS) is greater than the voltage threshold ($V_{TH}$) in the determination in step 306. In this step, a rising edge of a bus voltage is detected on the output voltage bus.

This loop through steps 306, 308, 310, and 312 is used to ensure that power has not been supplied to the output voltage bus for a safe time period before turning on power to the output voltage bus. This loop is used to provide time for circuits to discharge when a power supply unit supplied power to the output voltage bus that resulted in a fault and the power supply shutting off. In response to bus voltage (BUS) being greater than the voltage threshold ($V_{TH}$) in step 306, the process proceeds to step 314 to turn on power to the output voltage bus.

With reference again to step 302, if the bus voltage (BUS) is greater than the voltage threshold ($V_{TH}$), the process follows a different path and sets the counter equal to a stable time ($t_{STABLE}$) (step 318). In this illustrative example, the stable time ($t_{STABLE}$) is an example of stable time 134 in FIG. 1 and can be selected such that the counter decrements over a stable time period such as stable time period 128 in FIG. 1. This time period is used to ensure that the power applied by another power supply unit to the output voltage bus will be stable. In other words, this time period can be set to make sure that the power supply unit supply voltage does not shut off because of a heavy load. The stable time ($t_{STABLE}$) can be about 500 ms in this example. The value can change depending on the particular implementation and power supply units used.

The process then determines whether bus voltage (BUS) is greater than the voltage threshold ($V_{TH}$) (step 318). If bus voltage (BUS) is greater than the voltage threshold ($V_{TH}$), the process decrements the counter (step 320). A determination is made as to whether the counter is equal to zero (step 322). If the counter is not equal to zero, the process waits for a delay period ($t_{DELAY}$) (step 324). The process then returns to step 318.

The process loops through steps 318, 320, 322, and 324 until the counter is equal to zero. This loop is used to monitor for a stable time for bus voltage (BUS). With reference again step 322, when the counter reaches zero, the process proceeds to step 314 to turn on power to the output voltage bus described above. In this case, the output voltage bus is considered stable.

The process also exits the loop in steps 318, 320, 322, and 324 in response to a determination in step 318 that the bus voltage (BUS) is not greater than the voltage threshold ($V_{TH}$). In step 318, a falling edge of the bus voltage on output voltage bus is detected.

In this case, the power applied to the output voltage bus is not stable. In other words, the other power supply applying voltage to the output power bus shuts off. The shut off can be caused by a load that is too heavy for the power supply unit for power supply units already supplying power to the output voltage bus or from some other fault.

As a result, the process sets the counter to a hiccup time ($t_{HICCUP}$) (step 326). The process then proceeds to step 306 as described above using the counter set with the hiccup time ($t_{HICCUP}$). In this example, the hiccup time ($t_{HICCUP}$) is an example of hiccup time 136 in FIG. 1 and can be set such that a time period passes to allow synchronization in turning on the power supply units. In this example, the hiccup time ($t_{HICCUP}$) can be set to 2000 ms. The value can change depending on the particular implementation and power supply units used. With reference again to step 316, if a fault occurs, the process also proceeds to step 326 as described above.

Figure 4:
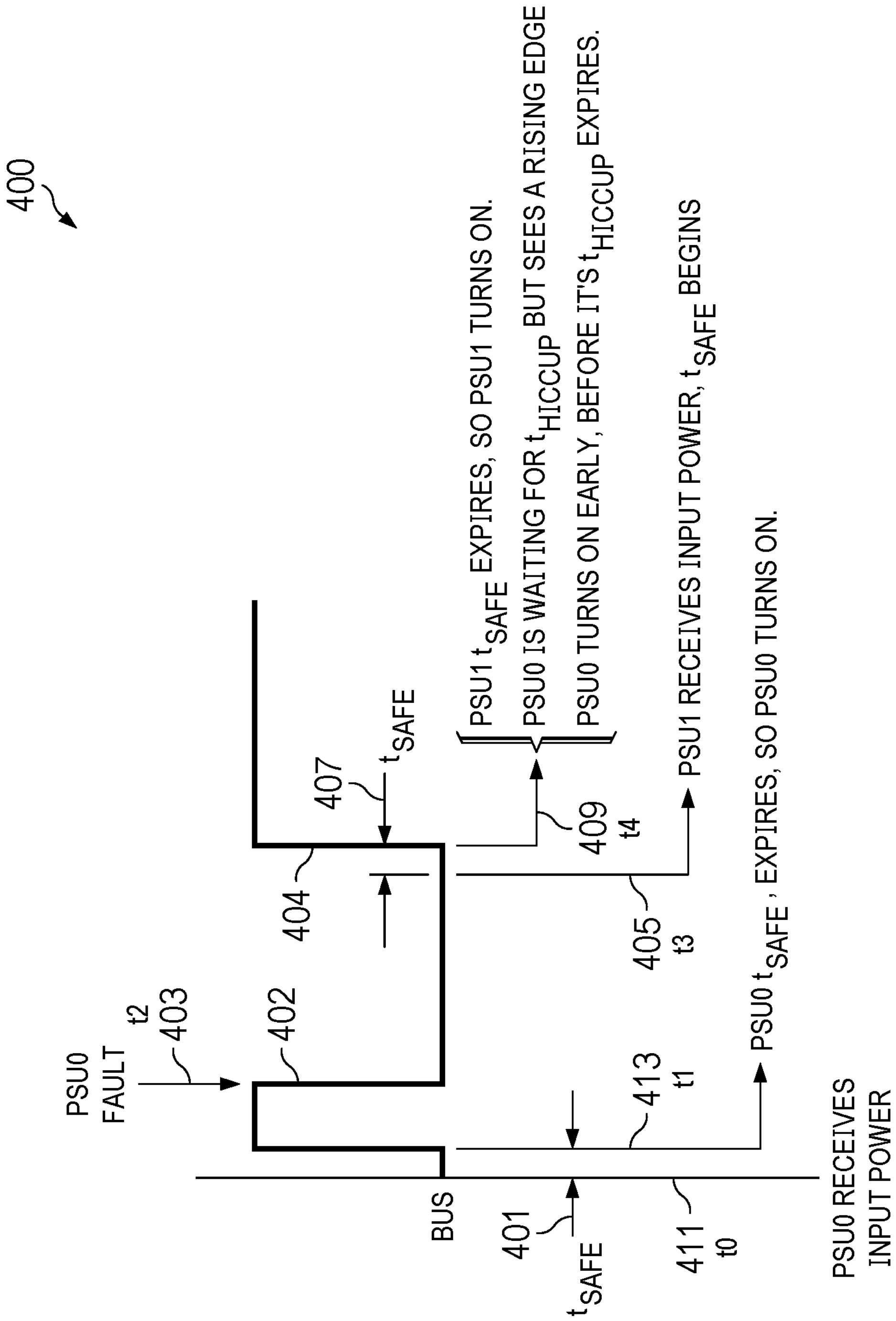
FIG. 4 is a timing diagram for a first power supply unit turning on into a heavy load while a second power supply unit turns on after the first power supply unit faulting in accordance with an illustrative embodiment.
Figure 5:
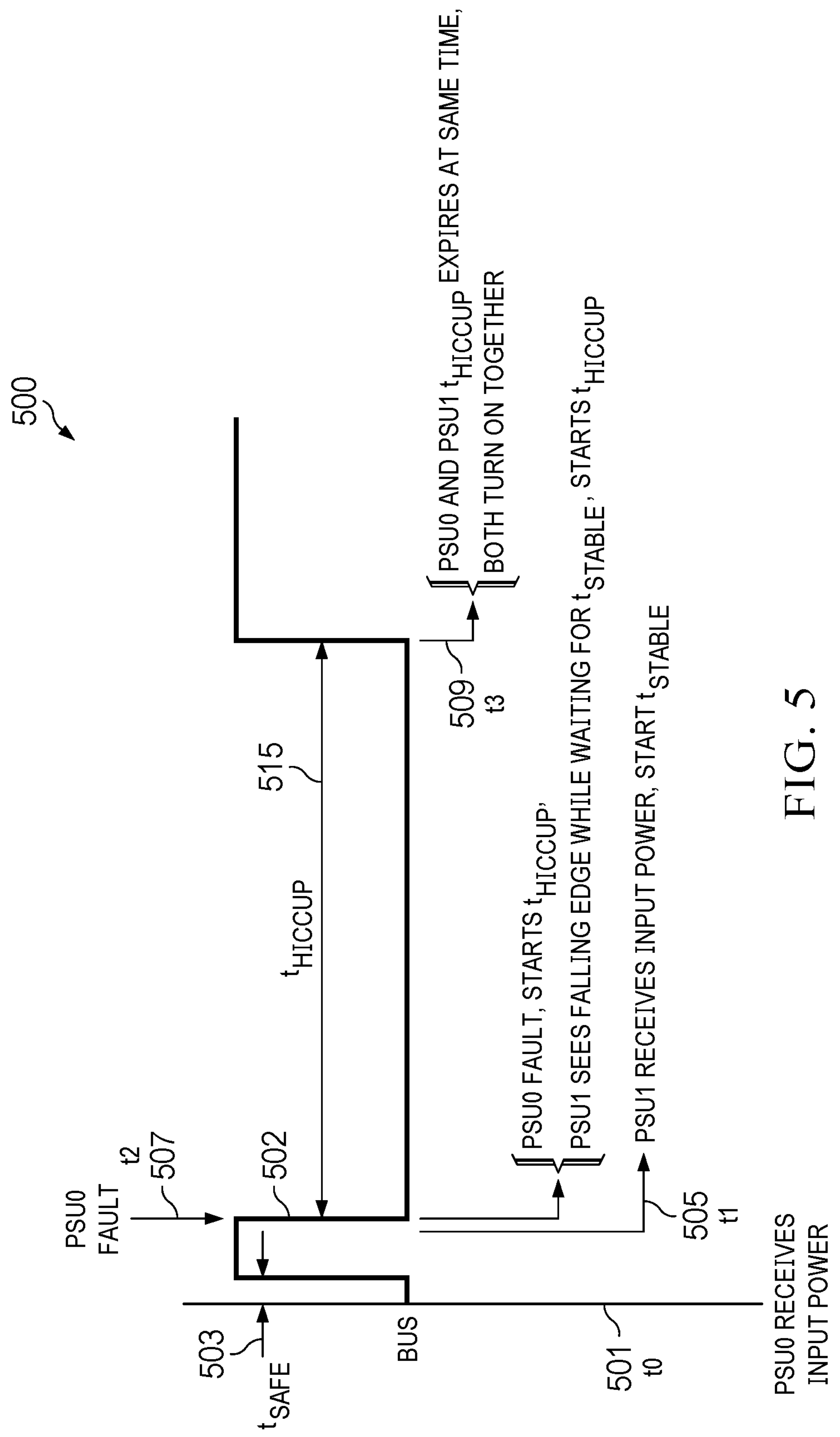
FIG. 5 is a timing diagram for a first power supply unit turning on into a heavy load while a second power supply unit turns on prior to the first power supply unit faulting in accordance with an illustrative embodiment.
Figure 6:
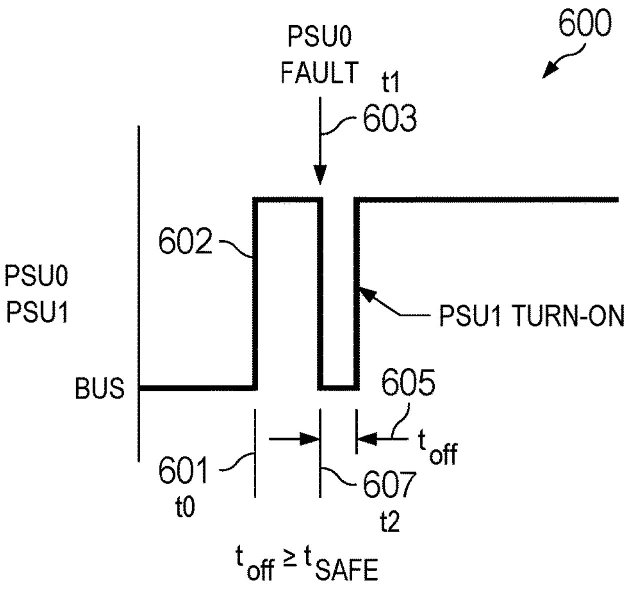
FIG. 6 is a timing diagram for to save time period in accordance with an illustrative embodiment.

Next in FIGS. 4-6, timing diagrams illustrating the operation of power supply units switching on are depicted. Turning first to FIG. 4, a timing diagram for a first power supply unit turning on into a heavy load while a second power supply unit turns on after the first power supply unit faulting is depicted in accordance with an illustrative embodiment. In timing diagram 400, a bus voltage is shown on an output voltage bus connected to two power supply units, PSU0 and PSU1. In this example, PSU0 is the first power supply unit to receive input power. In other words, PSU0 is the first power supply unit to be plugged in at time t0 411.

As depicted, the bus voltage is zero for safe time ($t_{SAFE}$) 401. Line 402 shows the bus voltage caused power from PSU0 sent on to the output voltage bus voltage after safe time 401 has passed at time t1 413. In this illustrative example, a fault occurs for PSU0 at time t2 403. This fault results in PSU0 shutting off, which can be seen as the bus voltage dropping in line 402.

In this case, the counter for PSU0 is set to a hiccup time ($t_{HICCUP}$). At time t3 405, PSU1 receives input power. After safe time ($t_{SAFE}$) 407 for PSU1, PSU1 switches on power to the output voltage bus causing the bus voltage to rise at time t4 409 as shown in line 404 causing the bus voltage to rise at time t4 409. PSU0 has been waiting for the expiration of its counter that was set to the hiccup time ($t_{HICCUP}$) and sees the rising edge in the bus voltage from PSU0 switching on power to the output voltage bus. As result, PSU0 also turns on prior to the counter for hiccup time ($t_{HICCUP}$) reaching zero at time t4 409. This increase in voltage from PSU0 and PSU1 switching on power to the output voltage bus are shown by the bus voltage in line 404 at time t4 409.

Next in FIG. 5, a timing diagram for a first power supply unit turning on into a heavy load while a second power supply unit turns on prior to the first power supply unit faulting is depicted in accordance with an illustrative embodiment. In timing diagram 500, a bus voltage is shown on an output voltage bus connected to two power supply units, PSU0 and PSU1. PSU0 is the first power supply unit to receive input power at time t0 501.

In this example, the bus voltage is zero for safe time ($t_{SAFE}$) 503 and supplies power to the output voltage bus as shown by line 502. PSU1 receives input power at time t1 505. At time t1 505, PSU0 sees that the bus voltage on the output voltage bus is greater than the voltage threshold ($V_{TH}$), PSU1 sets a counter to wait for a stable time ($t_{STABLE}$) to monitor for stability of power being supplied to the output voltage bus.

In this example, PSU0 faults at time t2 507 after time t1 505. The fault in this example is a result of heavy loading. Additionally, while waiting for the stable time ($t_{STABLE}$) to expire, PSU1 sees the falling edge of the bus voltage at time t2 507 and resets its counter for hiccup time ($t_{HICCUP}$) 515.

In this example, the counters for PSU0 and PSU1 set to hiccup time ($t_{HICCUP}$) reach zero at the same time at time t3 509. Both power supply units turn on at the same time at time t3 509 and the bus voltage rises on the output voltage bus as shown in line 502 at time t3 509.

With reference to FIG. 6, a timing diagram for tuning on a first power supply unit and a second power supply unit using a safe time is depicted in accordance with an illustrative embodiment. In timing diagram 600, a bus voltage is shown on an output voltage bus connected to two power supply units, PSU0 and PSU1. In this example, PSU0 is the first power supply unit to receive input power in this example and turns on at time t0 601 as shown by line 602 for the bus voltage on the output voltage bus. As depicted, PSU0 faults at time t1 603 resulting in the bus voltage falling as depicted by line 602.

In this example, PSU1 is plugged in after the bus voltage is already less than the voltage threshold. PSU1 turns on after a time $t_{SAFE}$. PSU1 is plugged in at time t2 607 immediately after PSU0 faults at time t1 603.

Depending on the timing of when PSU1 turns on, time $t_{off}$ 605 is greater than or equal to time $t_{SAFE}$. In this example, the use of time $t_{SAFE}$ enables ensuring that $t_{off}$ 605 is greater than or equal to time $t_{SAFE}$ allowing for a discharge of any circuits that may have received power supplied to the output voltage bus by PSU0 prior to this power supply unit faulting. As result, short time periods for $t_{off}$ 605 that can be confusing or stressful to a computer system can be avoided through the use of time $t_{SAFE}$ in the power supply units.

Figure 7:
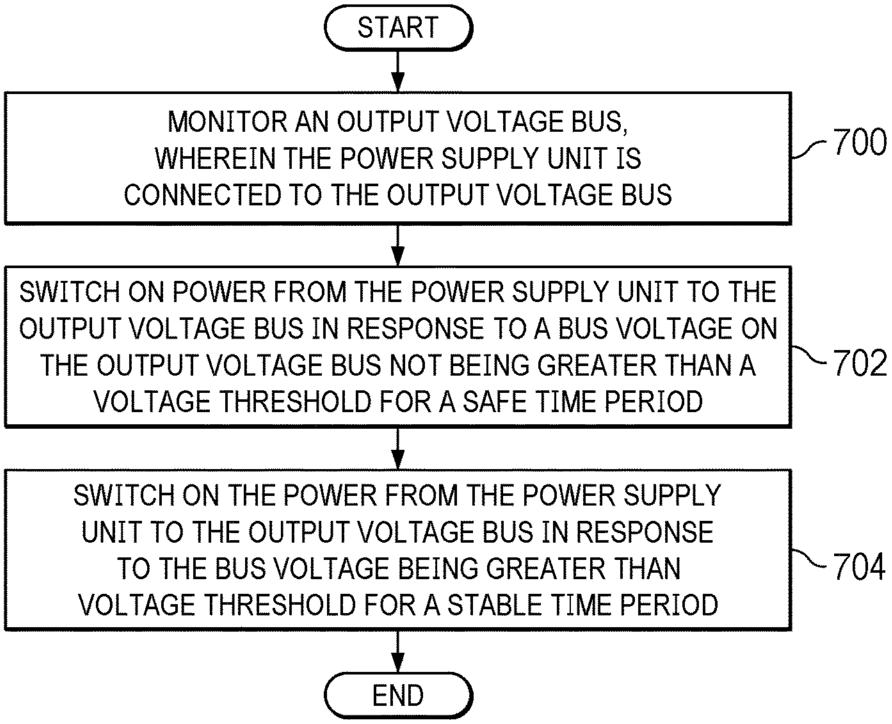
FIG. 7 is a flowchart of a process for turning on the power supply unit in accordance with an illustrative embodiment.

With reference now to FIG. 7, a flowchart of a process for turning on the power supply unit is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in power manager 114 in power supply unit 112 in FIG. 1.

The process begins by monitoring an output voltage bus, wherein the power supply unit is connected to the output voltage bus (step 700). The process switches on power from the power supply unit to the output voltage bus in response to a bus voltage on the output voltage bus not being greater than a voltage threshold for a safe time period (step 702). The process also switches on the power from the power supply unit to the output voltage bus in response to the bus voltage being greater than voltage threshold for a stable time period (step 704). The process terminates thereafter.

Figure 8:
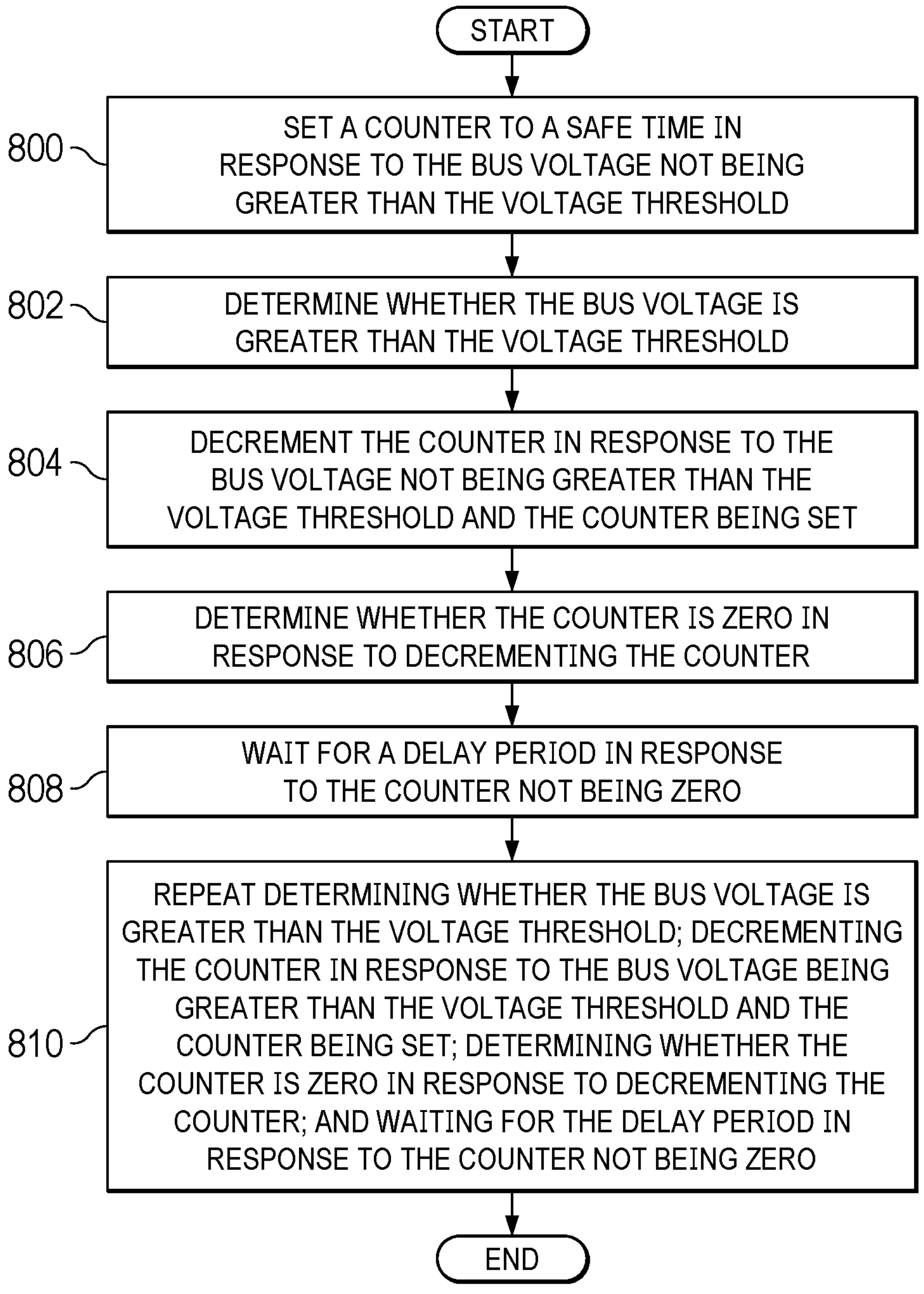
FIG. 8 is a flowchart of a process for a implementing a safe time period using a counter in accordance with an illustrative embodiment. As depicted in accordance with an illustrative embodiment.

Turning next to FIG. 8, a flowchart of a process for a implementing a safe time period using a counter is depicted in accordance with an illustrative embodiment. As depicted in accordance with an illustrative embodiment. The process illustrated in FIG. 8 comprises additional steps that can be performed with the steps in FIG. 7.

The process begins by setting a counter to a safe time in response to the bus voltage not being greater than the voltage threshold (step 800). The process determines whether the bus voltage is greater than the voltage threshold (step 802).

The process decrements the counter in response to the bus voltage not being greater than the voltage threshold and the counter being set (step 804). The process determines whether the counter is zero in response to decrementing the counter (step 806). The process waits for a delay period in response to the counter not being zero (step 808).

The process repeats determining whether the bus voltage is greater than the voltage threshold; decrementing the counter in response to the bus voltage not being greater than the voltage threshold and the counter being set; determining whether the counter is zero in response to decrementing the counter; and waiting for the delay period in response to the counter not being zero (step 810). The process terminates thereafter in step 810 when the safe time period ends with the counter being equal to zero.

Figure 9:
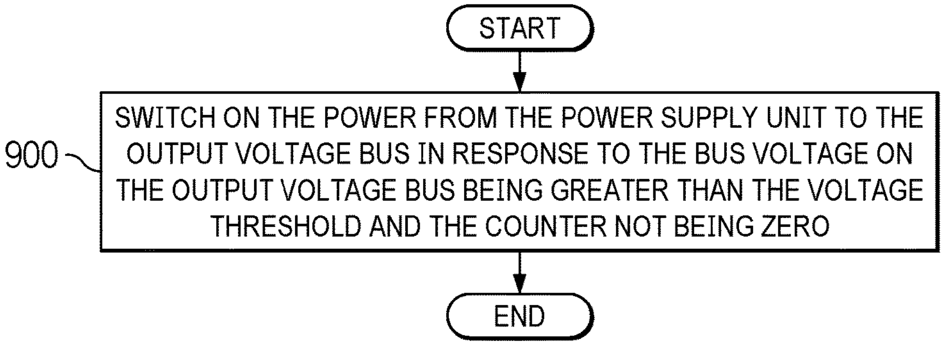
FIG. 9 is a flowchart of a process for switching on a power from the power supply unit to an output voltage bus in accordance with an illustrative embodiment.

In FIG. 9, a flowchart of a process for switching on a power from the power supply unit to an output voltage bus is depicted i in accordance with an illustrative embodiment. The step in this figure is an additional step that can be performed with the steps in FIG. 8.

The process switches on the power from the power supply unit to the output voltage bus in response to the bus voltage on the output voltage bus being greater than the voltage threshold and the counter not being zero (step 900). The process terminates thereafter.

Figure 10:
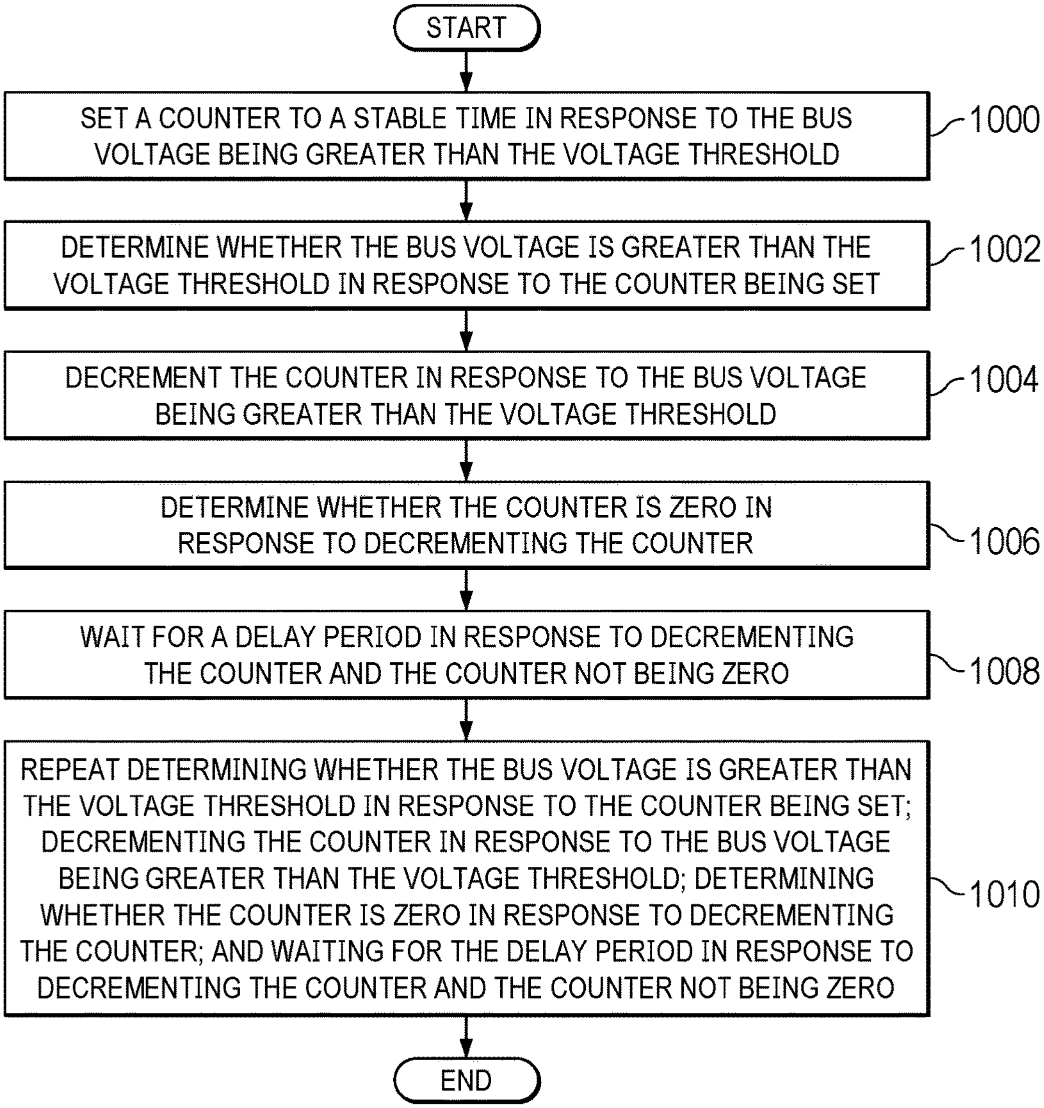
FIG. 10 is a flowchart of a process for implementing a stable time period using a counter in accordance with an illustrative embodiment.

With reference now to FIG. 10, a flowchart of a process for implementing a stable time period using a counter is depicted in accordance with an illustrative embodiment. As depicted in accordance with an illustrative embodiment. The process illustrated in FIG. 10 comprises additional steps that can be performed with the steps in FIG. 7.

The process sets a counter to a stable time in response to the bus voltage being greater than the voltage threshold (step 1000). The process determines whether the bus voltage is greater than the voltage threshold in response to the counter being set (step 1002).

The process decrements the counter in response to the bus voltage not being greater than the voltage threshold (step 1004). The process determines whether the counter is zero in response to decrementing the counter (step 1006). The process waits for a delay period in response to decrementing the counter and the counter not being zero (step 1008).

The process repeats determining whether the bus voltage is greater than the voltage threshold in response to the counter being set; decrementing the counter in response to the bus voltage being greater than the voltage threshold; determining whether the counter is zero in response to decrementing the counter; and waiting for the delay period in response to decrementing the counter and the counter not being zero (step 1010). The process terminates thereafter. In this flowchart, the stable time period ends when the counter is equal to zero.

Figure 11:
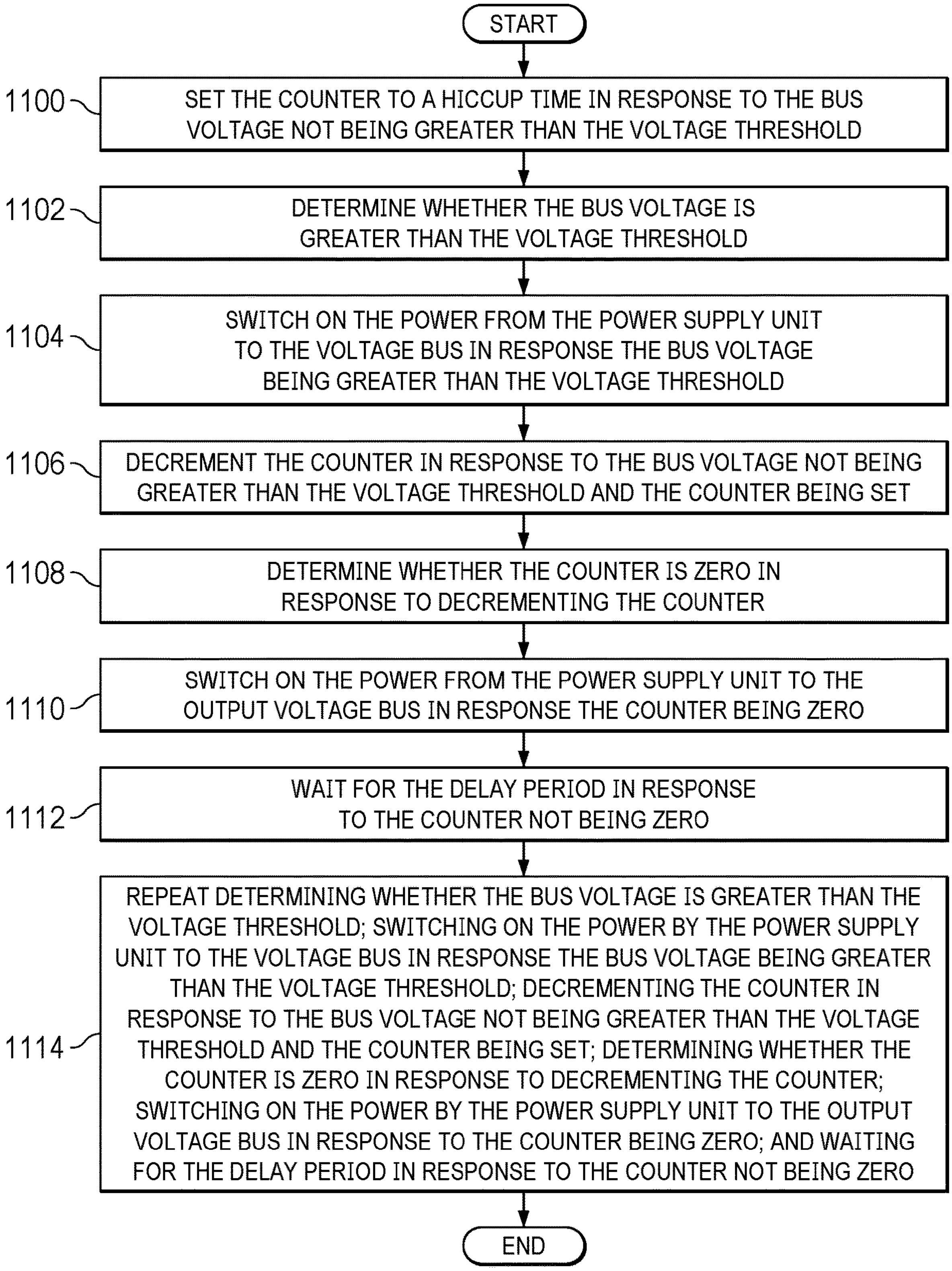
FIG. 11 is a flowchart of process for handling in abnormal sequence of a power supply unit turning on and turning off in accordance with an illustrative embodiment.

Turning next to FIG. 11, a flowchart of process for handling in abnormal sequence of a power supply unit turning on and turning off is depicted in accordance with an illustrative embodiment. The steps in this flowchart are steps that can be performed in addition to the steps in FIG. 10. The steps can take into account the occurrence of a hiccup in power supply unit operation in which a power supply unit turns on, shuts off, waits for a period of time, and repeats the sequence.

The process begins by setting the counter to a hiccup time in response to the bus voltage not being greater than the voltage threshold (step 1100). In step 1100, a time value already set in the counter is overwritten with a hiccup time. The process determines whether the bus voltage is greater than the voltage threshold (step 1102).

The process switches on the power from the power supply unit to the output voltage bus in response the bus voltage being greater than the voltage threshold (step 1104). The process decrements the counter in response to the bus voltage not being greater than the voltage threshold and the counter being set (step 1106).

The process determines whether the counter is zero in response to decrementing the counter (step 1108). The process switches on the power from the power supply unit to the output voltage bus in response the counter being zero (step 1110). The process waits for the delay period in response to the counter not being zero (step 1112).

The process repeats determining whether the bus voltage is greater than the voltage threshold; switching on the power by the power supply unit to the output voltage bus in response the bus voltage being greater than the voltage threshold; decrementing the counter in response to the bus voltage not being greater than the voltage threshold and the counter being set; determining whether the counter is zero in response to decrementing the counter; switching on the power by the power supply unit to the output voltage bus in response to the counter being zero; and waiting for the delay period in response to the counter not being zero (step 1114). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Thus, illustrative embodiments of the present invention provide a computer implemented method, computer system, and computer program product for turning on power supply units. In the illustrative examples, each power supply unit monitors the output voltage bus for activity and implements timers to ensure stability of power supplied to the output voltage bus. If the power supply unit detects that power is not being supplied to the output voltage bus, the power supply unit waits for some safe time period to turn on. Once that safe time period passes, the power supply can switch on power from the power supply unit to the output voltage bus. While in this time period, a power supply units can turn on immediately regardless of its internal state if a rising edge in the bus voltage is detected. In other words, if the bus voltage increases above some threshold, the power supply unit can turn on.

In the case when the power supply unit detects that power has already been supplied to the output voltage bus, the power supply unit can monitor for stability in the power being supplied. If bus voltage on the output voltage bus remains above a threshold indicating power is present, the power supply unit can turn on after a stable time period. If the power supply unit detects instability, then the power supply unit can start a hiccup timer for turning on the power supply unit. In this case, other power supply units connected in parallel will also start this hiccup timer at the same time resulting in synchronization of when the power supply units turn on to supply power to the output voltage bus.

Thus, the illustrative examples provide a method, apparatus, system, and computer program for automatically starting power supply units connected in parallel. In the illustrative example, the automatic turn on of the power supply units can be synchronized in a manner that does not require a dedicated wire or link between the power supply units. In other words, changes to the power supply units to include communications links are unnecessary with the process being implemented in software/firmware in each of the power supply units. The illustrative examples can be implemented in currently available power supply units with the addition of program code for the processors in the power supply units. As a result, power supply units can be scaled without requiring modifications for communications and can be used in place of creating larger power supply units.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for turning on a power supply unit, the method comprising:

monitoring, by a processor unit in the power supply unit, an output voltage bus, wherein the power supply unit is connected to the output voltage bus;

switching on, by the processor unit in the power supply unit, power from the power supply unit to the output voltage bus in response to a bus voltage on the output voltage bus not being greater than a voltage threshold for a safe time period, wherein the safe time period ensures that the output voltage bus does not have the power for the safe time period to enable circuits that may have been powered to discharge;

switching on, by the processor unit in the power supply unit, the power from the power supply unit to the output voltage bus in response to the bus voltage being greater than the voltage threshold for a stable time period, wherein the stable time period ensures that the power applied by another power supply unit to the output voltage bus is stable and will not shut off because of heavy load;

setting, by the processor unit in the power supply unit, a counter to a stable time in response to the bus voltage being greater than the voltage threshold;

determining, by the processor unit in the power supply unit, whether the bus voltage is greater than the voltage threshold in response to the counter being set;

decrementing, by the processor unit in the power supply unit, the counter in response to the bus voltage being greater than the voltage threshold;

determining, by the processor unit in the power supply unit, whether the counter is zero in response to decrementing the counter;

waiting, by the processor unit in the power supply unit, for a delay period in response to decrementing the counter and the counter not being zero; and repeating, by the processor unit in the power supply unit, determining whether the bus voltage is greater than the voltage threshold in response to the counter being set; decrementing the counter in response to the bus voltage being greater than the voltage threshold; determining whether the counter is zero in response to decrementing the counter; and waiting for the delay period in response to decrementing the counter and the counter not being zero, wherein the stable time period ends when the counter is zero.

2. The method of claim 1 further comprising:

setting, by the processor unit in the power supply unit, the counter to a safe time in response to the bus voltage not being greater than the voltage threshold;

determining, by the processor unit in the power supply unit, whether the bus voltage is greater than the voltage threshold;

decrementing, by the processor unit in the power supply unit, the counter in response to the bus voltage not being greater than the voltage threshold and the counter being set;

determining, by the processor unit in the power supply unit, whether the counter is zero in response to decrementing the counter;

waiting, by the processor unit in the power supply unit, for the delay period in response to the counter not being zero; and repeating, by the processor unit in the power supply unit, determining whether the bus voltage is greater than the voltage threshold; decrementing the counter in response to the bus voltage not being greater than the voltage threshold and the counter being set; determining whether the counter is zero in response to decrementing the counter; and waiting for the delay period in response to the counter not being zero, wherein the safe time period ends when the counter is zero.

3. The method of claim 2 further comprising:

switching on, by the processor unit in the power supply unit, the power from the power supply unit to the output voltage bus in response to the bus voltage on the output voltage bus being greater than the voltage threshold and the counter not being zero.

4. The method of claim 1 further comprising:

detecting, by the processor unit of the power supply unit, that the power supply unit is continuously cycling on and off in an abnormal sequence indicating that the power supplied to the output voltage bus is unstable and is identified as a hiccup in power supply unit operation;

determining, by the processor unit of the power supply unit, that the bus voltage is not greater than the voltage threshold;

replacing, by the processor unit in the power supply unit, the stable time period of the counter with a hiccup time period to allow synchronization of turning on other power supply units connected in parallel with the power supply unit in response to the bus voltage not being greater than the voltage threshold, wherein the other power supply units use the hiccup time period at a same time as the power supply unit resulting in the synchronization of when given power supply units turn on to supply the power to the output voltage bus;

determining, by the processor unit in the power supply unit, whether the bus voltage is greater than the voltage threshold;

switching on, by the processor unit in the power supply unit, the power from the power supply unit to the output voltage bus in response to the bus voltage being greater than the voltage threshold;

decrementing, by the processor unit in the power supply unit, the counter in response to the bus voltage not being greater than the voltage threshold and the counter being set;

determining, by the processor unit in the power supply unit, whether the counter is zero in response to decrementing the counter;

switching on, by the processor unit in the power supply unit, the power from the power supply unit to the output voltage bus in response to the counter being zero;

waiting, by the processor unit in the power supply unit, for the delay period in response to the counter not being zero; and repeating, by the processor unit in the power supply unit, determining whether the bus voltage is greater than the voltage threshold; switching on the power by the power supply unit to the output voltage bus in response to the bus voltage being greater than the voltage threshold; decrementing the counter in response to the bus voltage not being greater than the voltage threshold and the counter being set; determining whether the counter is zero in response to decrementing the counter; switching on the power by the power supply unit to the output voltage bus in response to the counter being zero; and waiting for the delay period in response to the counter not being zero.

5. The method of claim 1, wherein the voltage threshold indicates that the power is being supplied to the output voltage bus.

6. The method of claim 1, wherein the power supply unit is part of a plurality of power supply units connected in parallel to each other and having outputs connected to the output voltage bus.

7. A power supply system comprising:

a power supply unit;

a processor unit, wherein the processor unit executes program instructions to:

monitor an output voltage bus, wherein the power supply unit is connected to the output voltage bus;

switch on power by the power supply unit to the output voltage bus in response to a bus voltage on the output voltage bus not being greater than a voltage threshold for a safe time period, wherein the safe time period ensures that the output voltage bus does not have the power for the safe time period to enable circuits that may have been powered to discharge;

switch on the power by the power supply unit to the output voltage bus in response to the bus voltage being greater than the voltage threshold for a stable time period, wherein the stable time period ensures that the power applied by another power supply unit to the output voltage bus is stable and will not shut off because of heavy load;

set a counter to a stable time in response to the bus voltage being greater than the voltage threshold;

determine whether the bus voltage is greater than the voltage threshold in response to the counter being set;

decrement the counter in response to the bus voltage being greater than the voltage threshold;

determine whether the counter is zero in response to decrementing the counter;

wait for a delay period in response to decrementing the counter and the counter not being zero; and repeat determining whether the bus voltage is greater than the voltage threshold in response to the counter being set; decrementing the counter in response to the bus voltage being greater than the voltage threshold; determining whether the counter is zero in response to decrementing the counter; and waiting for the delay period in response to decrementing the counter and the counter not being zero, wherein the stable time period ends when the counter is zero.

8. The power supply system of claim 7, wherein the processor unit further executes program instructions to:

set the counter to a safe time in response to the bus voltage not being greater than the voltage threshold;

determine whether the bus voltage is greater than the voltage threshold;

decrement the counter in response to the bus voltage not being greater than the voltage threshold and the counter being set;

determine whether the counter is zero in response to decrementing the counter;

wait for the delay period in response to the counter not being zero; and repeat determining whether the bus voltage is greater than the voltage threshold; decrementing the counter in response to the bus voltage not being greater than the voltage threshold and the counter being set; determining whether the counter is zero in response to decrementing the counter; and waiting for the delay period in response to the counter not being zero, wherein the safe time period ends when the counter is zero.

9. The power supply system of claim 8, wherein the processor unit further executes program instructions to:

switch on the power from the power supply unit to the output voltage bus in response to the bus voltage on the output voltage bus being greater than the voltage threshold and the counter not being zero.

10. The power supply system of claim 7, wherein the processor unit further executes program instructions to:

detect that the power supply unit is continuously cycling on and off in an abnormal sequence indicating that the power supplied to the output voltage bus is unstable and is identified as a hiccup in power supply unit operation;

determine that the bus voltage is not greater than the voltage threshold;

replace the stable time period of the counter with a hiccup time period to allow synchronization of turning on other power supply units connected in parallel with the power supply unit in response to the bus voltage not being greater than the voltage threshold, wherein the other power supply units use the hiccup time period at a same time as the power supply unit resulting in the synchronization of when given power supply units turn on to supply the power to the output voltage bus;

determine whether the bus voltage is greater than the voltage threshold;

switch on the power from the power supply unit to the output voltage bus in response to the bus voltage being greater than the voltage threshold;

decrement the counter in response to the bus voltage not being greater than the voltage threshold and the counter being set;

determine whether the counter is zero in response to decrementing the counter;

switch on the power from the power supply unit to the output voltage bus in response to the counter being zero;

wait for the delay period in response to the counter not being zero; and repeat determining whether the bus voltage is greater than the voltage threshold; switching on the power by the power supply unit to the output voltage bus in response to the bus voltage being greater than the voltage threshold; decrementing the counter in response to the bus voltage not being greater than the voltage threshold and the counter being set; determining whether the counter is zero in response to decrementing the counter; switching on the power by the power supply unit to the output voltage bus in response to the counter being zero; and waiting for the delay period in response to the counter not being zero.

11. The power supply system of claim 7, wherein the voltage threshold indicates that the power is being supplied to the output voltage bus.

12. The power supply system of claim 7, wherein the power supply unit is part of a plurality of power supply units connected in parallel to each other and having outputs connected to the output voltage bus.

13. A computer program product for turning on a power supply unit, the computer program product comprising a computer readable storage medium having program instructions embodied therewith, the program instructions executable by a processor of the power supply unit to cause the processor to:

monitor an output voltage bus, wherein the power supply unit is connected to the output voltage bus;

switch on power by the power supply unit to the output voltage bus in response to a bus voltage on the output voltage bus not being greater than a voltage threshold for a safe time period, wherein the safe time period ensures that the output voltage bus does not have the power for the safe time period to enable circuits that may have been powered to discharge;

switch on the power by the power supply unit to the output voltage bus in response to the bus voltage being greater than the voltage threshold for a stable time period, wherein the stable time period ensures that the power applied by another power supply unit to the output voltage bus is stable and will not shut off because of heavy load;

set a counter to a stable time in response to the bus voltage being greater than the voltage threshold;

determine whether the bus voltage is greater than the voltage threshold in response to the counter being set;

decrement the counter in response to the bus voltage being greater than the voltage threshold;

determine whether the counter is zero in response to decrementing the counter;

wait for a delay period in response to decrementing the counter and the counter not being zero; and repeat determining whether the bus voltage is greater than the voltage threshold in response to the counter being set; decrementing the counter in response to the bus voltage being greater than the voltage threshold; determining whether the counter is zero in response to decrementing the counter; and waiting for the delay period in response to decrementing the counter and the counter not being zero, wherein the stable time period ends when the counter is zero.

14. The computer program product of claim 13, wherein the program instructions executable by the processor to further cause the processor to:

set the counter to a safe time in response to the bus voltage not being greater than the voltage threshold;

determine whether the bus voltage is greater than the voltage threshold;

decrement the counter in response to the bus voltage not being greater than the voltage threshold and the counter being set;

determine whether the counter is zero in response to decrementing the counter;

wait for the delay period in response to the counter not being zero; and repeat determining whether the bus voltage is greater than the voltage threshold; decrementing the counter in response to the bus voltage not being greater than the voltage threshold and the counter being set; determining whether the counter is zero in response to decrementing the counter; and waiting for the delay period in response to the counter not being zero, wherein the safe time period ends when the counter is zero.

15. The computer program product of claim 14, wherein the program instructions executable by the processor to further cause the processor to:

switch on the power from the power supply unit to the output voltage bus in response to the bus voltage on the output voltage bus being greater than the voltage threshold and the counter not being zero.

16. The computer program product of claim 13, wherein the program instructions executable by the processor to further cause the processor to:

detect that the power supply unit is continuously cycling on and off in an abnormal sequence indicating that the power supplied to the output voltage bus is unstable and is identified as a hiccup in power supply unit operation;

determine that the bus voltage is not greater than the voltage threshold;

replace the stable time period of the counter with a hiccup time period to allow synchronization of turning on other power supply units connected in parallel with the power supply unit in response to the bus voltage not being greater than the voltage threshold, wherein the other power supply units use the hiccup time period at a same time as the power supply unit resulting in the synchronization of when given power supply units turn on to supply the power to the output voltage bus;

determine whether the bus voltage is greater than the voltage threshold;

switch on the power from the power supply unit to the output voltage bus in response to the bus voltage being greater than the voltage threshold;

decrement the counter in response to the bus voltage not being greater than the voltage threshold and the counter being set;

determine whether the counter is zero in response to decrementing the counter;

switch on the power from the power supply unit to the output voltage bus in response to the counter being zero;

wait for the delay period in response to the counter not being zero; and repeat determining whether the bus voltage is greater than the voltage threshold; switching on the power by the power supply unit to the output voltage bus in response to the bus voltage being greater than the voltage threshold; decrementing the counter in response to the bus voltage not being greater than the voltage threshold and the counter being set; determining whether the counter is zero in response to decrementing the counter; switching on the power by the power supply unit to the output voltage bus in response to the counter being zero; and waiting for the delay period in response to the counter not being zero.

17. The computer program product of claim 13 wherein the voltage threshold indicates that the power is being supplied to the output voltage bus.

* * * * *